United States Patent
Chen et al.

(10) Patent No.: US 10,997,560 B2
(45) Date of Patent: May 4, 2021

(54) SYSTEMS AND METHODS TO IMPROVE JOB POSTING STRUCTURE AND PRESENTATION

(71) Applicant: Google Inc., Mountain View, CA (US)

(72) Inventors: Pei-Chun Chen, Mountain View, CA (US); Christian Posse, Belmont, CA (US); Zhao Zhang, Santa Clara, CA (US); Xuejun Tao, San Jose, CA (US)

(73) Assignee: Google LLC, Mountain View, CA (US)

( * ) Notice: Subject to any disclaimer, the term of this patent is extended or adjusted under 35 U.S.C. 154(b) by 1025 days.

(21) Appl. No.: 15/389,681

(22) Filed: Dec. 23, 2016

(65) Prior Publication Data

US 2018/0181915 A1    Jun. 28, 2018

(51) Int. Cl.
*G06Q 10/10*    (2012.01)
*G06F 16/35*    (2019.01)

(52) U.S. Cl.
CPC ....... *G06Q 10/1053* (2013.01); *G06F 16/353* (2019.01)

(58) Field of Classification Search
CPC combination set(s) only.
See application file for complete search history.

(56) References Cited

U.S. PATENT DOCUMENTS

| | | | |
|---|---|---|---|
| 6,370,510 B1 | 4/2002 | McGovern et al. | |
| 7,555,441 B2 | 6/2009 | Crow et al. | |
| 7,734,627 B1 | 6/2010 | Tong | |
| 7,761,320 B2 | 7/2010 | Fliess et al. | |
| 8,117,024 B2 | 2/2012 | Dane | |
| 8,438,137 B2 | 5/2013 | Gold et al. | |
| 8,650,177 B2 | 2/2014 | Skomoroch et al. | |
| 9,298,724 B1 | 3/2016 | Patil et al. | |
| 2008/0065630 A1 | 3/2008 | Luo et al. | |

(Continued)

FOREIGN PATENT DOCUMENTS

| CA | 2484440 | 4/2005 |
|---|---|---|
| WO | WO 00/26839 | 5/2000 |

(Continued)

OTHER PUBLICATIONS

Barkley et al., "Pivot", 2015 Master's Project, University of California, Berkeley, 61 pages.

(Continued)

*Primary Examiner* — Andrew B Whitaker
(74) *Attorney, Agent, or Firm* — Dority & Manning, P.A.

(57) ABSTRACT

The present disclosure provides systems and methods that improve job posting structure and presentation by, for example, classifying portions of job postings into informative sections. As an example, given a job posting, a computing system implementing aspects of the present disclosure can separate the job posting into multiple portions. After separation into portions, the computing system can classify each portion into the most plausible job-posting-specific section. For example, the computing system can include and implement a machine-learned classification model to classify the portions into the sections. Following classification, the computing system can modify the job posting based on the classification of the portions. In particular, the structure and/or presentation of the job posting can be improved based on the classification of the portions into the sections.

19 Claims, 5 Drawing Sheets

(56) References Cited

U.S. PATENT DOCUMENTS

| | | | |
|---|---|---|---|
| 2008/0086366 A1 | 4/2008 | Concordia et al. | |
| 2008/0147575 A1* | 6/2008 | Roy | G06F 16/35 |
| | | | 706/12 |
| 2009/0276415 A1 | 11/2009 | Dane | |
| 2013/0218620 A1 | 8/2013 | Liu et al. | |
| 2014/0081928 A1 | 3/2014 | Skomoroch et al. | |
| 2014/0122990 A1* | 5/2014 | Puppin | G06F 17/218 |
| | | | 715/229 |
| 2014/0201204 A1* | 7/2014 | Bharat | G06F 16/23 |
| | | | 707/732 |
| 2016/0078361 A1* | 3/2016 | Brueckner | H04L 67/10 |
| | | | 706/12 |
| 2018/0060788 A1* | 3/2018 | Mase | G06F 16/25 |
| 2018/0114279 A1* | 4/2018 | Abrams | G06Q 50/01 |

FOREIGN PATENT DOCUMENTS

| | | |
|---|---|---|
| WO | WO 01/004811 | 1/2001 |
| WO | WO 2005/038584 | 4/2005 |
| WO | WO 2008/034114 | 3/2008 |
| WO | WO 2010/009370 | 1/2010 |
| WO | WO 2016/053382 | 4/2016 |

OTHER PUBLICATIONS

Carty, "Did Indeed Hide Your Job Postings? Deduplication Explained", www.retruitingblogs.com/profiles/blogs/did-indeed-hide-your-job-postings-deduplication-explained, retrieved on Nov. 30, 2016, 10 pages.

Facebook Screenshot of "produ", retrieved on Dec. 19, 2016, 1 page.

Javed et al., "Towards a Job Title Classification System", arXiv:1606,00917v1, 2016—4 pages.

Kivimaki et al., "A Graph-Based Approach to Skill Extraction from Text", Proceedings of the TextGraphs-8 Workshop, Seattle, Washington, Oct. 18, 2013, pp. 79-87.

Lamche et al., "Interactive Explanations in Mobile Shopping Recommender Systems", ACM Conference Series on Recommender Systems—Joint Workshop on Interfaces and Human Decision Making for Recommender Systems, Foster City, Silicon Valley, California, Oct. 6, 2014, 8 pages.

Li et al., "One Permutation Hashing", Proceedings of the $25^{th}$ International Conference on Neural Information Processing Systems, Lake Tahoe, Nevada, Dec. 3-6, 2012, 9 pages.

LinkedIn Screenshot of "pro", retrieved on Dec. 19, 2016, 1 page.

"Near-Duplicates and Shingling", http://nlp.stanford.edu/IR-book/html/htmledition/near-duplicates-and-shingling-1, retrieved on Nov. 30, 2016, 5 pages.

Pathak, "Combating Web Plagiarism and Improving Internet Safety by Authenticating Web Content", 2010 International Conference for Internet Technology and Secured Transactions, London, United Kingdom, Nov. 8-11, 2010, 6 pages.

Spirin et al., "Unsupervised Approach to Generate Informative Structured Snippets for Job Search Engines", Proceedings of the $22^{nd}$ International Conference on World Wide Web Companion, Rio de Janeiro, Brazil, May 13-17, 20.13, pp. 203-204.

Tintarev et al., "A Survey of Explanations in Recommender Systems", Proceedings of the 2007 IEEE $23^{rd}$ Conference on Data Engineering Workshop, Istanbul, Turkey, Apr. 17-20, 2007, pp. 801-810.

Wikipedia, "MinHash", https://en.wikipedia.orglwiki/MinHash, retrieved on Dec. 19, 2016, 6 pages.

Zhao et al., "SKILL: A System for Skill Identification and Normalization", Proceedings of the Twenty-Seventh Conference on Innovative Applications of Artificial Intelligence, Austin, Texas, Jan. 25-30, 2015, pp. 4012-4017.

* cited by examiner

SYSTEMS AND METHODS TO IMPROVE JOB POSTING STRUCTURE AND PRESENTATION

FIELD

The present disclosure relates generally to job postings. More particularly, the present disclosure relates to systems and methods for improving job posting structure and presentation by, for example, classifying portions of job postings into informative sections.

BACKGROUND

An employer can post or otherwise submit a job posting to a company career site, a job board, an employment website, an applicant tracking system, or other job posting and search platforms. Job postings can include a number of sections that include information that describes various facets of the corresponding job that the employer is seeking to fill. Example sections that a job posting can include are "requirements," "responsibility and description," "company," "benefits," "other," or other sections (e.g., "environment"). A search engine can search available job postings (e.g., on the basis of a search query) to identify postings that may be applicable to an applicant.

However, a number of problems and challenges are associated with job postings. First, there is no defined standard when it comes to the format of job postings. As such, some job postings are ill structured. For example, some job postings wholly lack a breakdown into sections like requirements, responsibilities, etc. For example, some job postings may include only large chunks of plain text. Job postings of this nature are difficult to read. Therefore, job seekers are required to spend a significant amount of time going through lengthy job postings to find useful information or realize that the job is missing information important to them.

Other job postings may have information categorized into certain sections, but such information may be miscategorized or disjointed. For example, due to a lack of experience or skill by the job posting creator, information that should be placed within the benefits section may instead be incorrectly placed within the requirements section. Similarly, a job posting can describe benefits in a first paragraph, requirements in the next paragraph, and then return to discuss benefits in a third paragraph. Instead, it would be more user-friendly to have a defined structure in which all benefits are discussed in one section while all requirements are discussed in a separate section.

In another challenge raised by job postings, even assuming that all job postings are well structured, job seekers may value each section very differently. For example, some job seekers might care most about the job requirements, while other job seekers place more value on the benefits that the job has to offer. However, currently existing job posting platforms do not display job postings or generate snippets of job search results according to job seekers' preferences. Instead, job postings are snipped and displayed in the same way to all job seekers, which is not flexible and makes job hunting less user-friendly and a more time consuming process.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to improve job posting structure. The method includes obtaining, by one or more computing devices, a job posting. The method includes separating, by the one or more computing devices, the job posting into a plurality of portions. The method includes classifying, by the one or more computing devices, each portion of the job posting into one of a plurality of sections. The method includes modifying, by the one or more computing devices, the job posting based at least in part on the respective sections into which the portions of the job posting are respectively classified.

Another example aspect of the present disclosure is directed to a computing system to improve job posting structure. The computing system includes a machine-learned classifier model, one or more processors, and one or more non-transitory computer-readable medium that store instructions that, when executed by the one or more processors, cause the computing system to perform operations. The operations include obtaining a job posting. The operations include separating the job posting into a plurality of portions. The operations include respectively inputting each portion of the job posting into the machine-learned classifier model. The operations include receiving a respective classification of each portion of the job posting into one of a plurality of sections as an output of the machine-learned classifier model. The operations include modifying the job posting based at least in part on the respective sections into which the portions of the job posting are respectively classified.

Another example aspect of the present disclosure is directed to a non-transitory, computer-readable medium that stores instructions that, when executed by one or more processors of one or more computing devices, cause the one or more computing devices to perform operations. The operations include obtaining a job posting. The operations include segmenting the job posting into a plurality of paragraphs. The operations include determining an initial classification for each of the plurality of paragraphs into one of a plurality of sections. The operations include comparing, for each of the plurality of paragraphs, the initial classification for such paragraph to the initial classification for one or more neighboring paragraphs. The operations include adjusting the initial classification for at least a first paragraph based at least in part on the comparison performed for the first paragraph.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Generally, the present disclosure is directed to systems and methods for improving job posting structure and presentation by, for example, classifying portions of job postings into informative sections. As an example, given a job posting, a computing system implementing aspects of the present disclosure can separate the job posting into multiple portions. For example, the computing system can separate the job posting into the portions based on syntactic cues such as, for example, HTML tags. After separation into portions, the computing system can classify each portion into the most plausible job-posting-specific section. For example, example sections include company information, responsibilities, requirements, benefits, etc. In some implementations, the computing system can include and implement a machine-learned classification model to classify the portions into the sections. Following classification, the computing system can modify the job posting based on the classification of the portions. In particular, the structure and/or presentation of the job posting can be improved based on the classification of the portions into the sections.

In one example modification based on the classification, in some implementations, a computing system implementing aspects of the present disclosure can add a header for a particular section to the job posting if such header is missing. For example, if a portion of the job posting is classified into the requirements section, but there is not a header or label of any sort mentioning "Requirements" in the original job posting, then the computing system can add a label or header just before the portion. The header can have the appropriate font, indentation, etc. Addition of a header in this fashion can render the job posting more readable and improve the job posting structure.

In another example modification of the job posting, in some implementations, the computing system can color the portions of the job posting differently according to the sections into which they were classified. For example, all portions classified into the requirements section can be colored red while all portions classified into the benefits section can be colored green. Since certain portions classified into the same section might appear in the job posting at multiple places unconnected to each other, the addition of coloring as described above can make it easier for a job seeker to recognize all the text belonging to a section in which they are interested. In some implementations, the colors respectively assigned to the sections can be adjustable and/or toggleable by a user, so that a user can easily recognize the sections in which they are specifically interested.

In yet another example modification of the job posting, in some implementations, the computing system can reconstruct the job posting by, for example, reordering the portions such that portions of the job posting that are classified into a same respective section are placed adjacent to each other. Thus, the structure of the job posting can be improved by placing related portions together. By contrast, the original job posting may have included the portions in a less orderly fashion.

Furthermore, by improving the structure of the job posting, the structure and utility of corresponding job posting snippets can be improved as well. Thus, by determining an improved classification for the portions of the job posting, a snippet of such job posting can include structured and informative information for each of one or more of the sections. Alternatively or additionally, the snippet of the job postings can include portions that have been classified into the sections that are generally regarded as the most important. For example, the requirements section is generally regarded as more important than the other section and, as such, portions classified into such section can be featured prominently in the snippet.

According to another aspect of the present disclosure, in some implementations, the computing system can modify the job posting to provide a personalized version of the job posting or personalized snippet of the job posting. For example, when providing the job posting or a snippet of the job posting for display to a particular user, the computing system can first retrieve user preference information associated with such user. In particular, the particular user may have explicitly entered a ranking of section importance. Additionally or alternatively, such user preference information can be inferred based on user feedback, user actions/activity, or other information. For example, if a user more frequently performs searches the include terms related to benefits, then the computing system can infer that the user places a higher importance on the benefits section. Likewise, if the user more frequency clicks on or interacts with the benefits sections of job postings, then again it can be inferred that the user places higher importance on the benefits section.

In one example, the computing system can reorder the portions of the job posting such that the portions are presented according to a ranking of section importance associated with the particular user. Thus, for example, a user may have explicitly or implicitly indicated that she prefers to first review the benefits section, then the requirements section, and so forth. The computing system can reorder the portions of the job posting based on their assigned classifications so that portions classified into the benefits section are provided first, the portions classified into the requirements section are provided second, and so forth. Other users may have different rankings of section importance and the job posting can be modified according to such different rankings.

In another example, the computing system can generate a personalized snippet of the job posting based at least in part on the ranking of section importance. In one example, the personalized snippet may include only a limited number of snippets from the highest ranked sections. In another example, snippets can be selected according to the ranking until a defined screen space or area is filled. In yet another example, the size of a respective snippet taken from each section can be correlated to the importance of such section (e.g., higher ranked sections have larger snippets taken therefrom).

Thus, in some implementations, the computing system can use user preference information in combination with the classification of the portions into the sections to provide the particular user with a personalized version of the job posting or personalized snippet of the job posting. Generation and presentation of user-specific job postings and snippets provides a unique and user-friendly job search experience that is tailored to each particular user's preferences.

Likewise, any aspects described by the present disclosure as applicable to provide improved and/or personalized search results can equally be applied to provide improved and/or personalized recommendations, dashboard information, or other information presentations in which information (e.g., job postings or snippets of job postings) is provided without receipt of an explicit search query from the user. For example, a personal assistant application can automatically retrieve and present job postings or job posting snippets without being prompted by the user with an explicit search query.

According to another aspect of the present disclosure, in some implementations, the predicted classifications for the portions of the job posting can affect the job posting's ranking as a search result. For example, the computing system can penalize a job posting that, following classification, is missing significant sections (e.g., the job posting does not have at least one portion classified into each of a plurality of required sections). In some implementations, the set of required sections can be user-defined, such that a job posting's search result ranking is penalized if the job posting does not include at least one portion classified into each of such user-defined required sections.

In another example, in some implementations, the computing system can assign different weights to keyword matches found in different sections. Thus, in such implementations, the classification of a portion into a particular section will influence the weight assigned to keywords matched to a search query from such section. For example, matching keywords from a portion classified into the company section might be weighted less than matching keywords from a portion classified into the requirements section. In some implementations, the weighting applied to keyword matches from different sections can be user-defined or based on the user-specific ranking of section importance described above. Thus, the computing system can provide improved, user-specific search results by weighting keywords according to user preferences regarding section importance.

According to another aspect of the present disclosure, in some implementations, the classification of the portions into sections can yield benefits when attempting to classify the job posting as a whole into a job category that is descriptive of the type of position listed by the job posting (e.g., road construction job category vs dental hygienist category). In particular, some sections are not as meaningful as others when it comes to classifying jobs into job categories. In some instances, these less meaningful sections can be denominated as "noisy." As an example, the "benefits" and "other" sections tend to be similar across all job postings and therefore contribute less toward performing whole-posting job category classification. As such, in some implementations of the present disclosure, the computing system can remove one or more portions of the job posting that have been classified into one or more noisy sections and, subsequently, classify the job posting into one of a plurality of job categories based on the remaining portions of the job posting.

In addition, in some implementations, the classification of the portions into sections can yield benefits when attempting to extract certain features from the job posting. As examples, a skill extractor can be implemented to attempt to extract required skills from the job posting; a benefits extractor can be implemented to attempt to extract benefits from the job posting; a years of experience extractor can be implemented to extract a number of years of experience required for the job; and/or other extractors can be implemented to extract other features. As such, according to an aspect of the present disclosure, such extractors can be applied to only portions of the job posting that have been classified into a section that is relevant to the feature such extractors are attempting to extract. As examples, the skill extractor can be applied to only portions of the job posting that have been classified into the requirements section; the benefits extractor can be applied to only portions of the job posting that have been classified into the benefits section; and the years of experience extractor can be applied to only portions of the job posting that have been classified into the requirements section. In such fashion, the extractors are given only the most pertinent portions of the job posting, thereby enabling the extractors to provide more precise, less noisy results and fewer false positives. Providing only certain portions to the extractors also reduces computational time associated with the extractors.

In another example aspect, portions classified into the company section can serve as a description for the company in a profile page for the company.

According to yet another aspect of the present disclosure, in addition to classification after a job posting has been created and posted, the classification techniques described herein can also provide benefits when applied to a scenario in which a job posting is being actively created. In some instances, these benefits may be denominated as "coaching" a job posting creator. As one example, in some implementations, a computing system assisting an employer in creating a job posting can perform classification (e.g., in the background iteratively) on the current draft of the posting and can provide a notification to the employer if certain important sections are missing (e.g., if the classification results in no portions being classified into a certain important section). In another example, the computing system can generally indicate which sections are most important.

As another example coaching technique, in some implementations, the computing system can determine that a first portion of the job posting is misplaced based at least in part on the classification. For example, the first portion may be classified into the benefits section but be separated from a main sequence of portions classified into the benefits section. The computing system can provide a notification to an owner or creator of the job posting that indicates that the first portion is misplaced. The owner or creator can edit the job posting to reposition the first portion into the correct location/order. In further implementations, the computing system can provide statistical feedback to the posting creator. For example, the computing system can indicate sections that would benefit from additional information and can provide an indication of an estimated increase in click-throughs that the posting would receive if such information were provided.

Thus, the present disclosure provides systems and methods for improving job posting structure and presentation by, for example, classifying portions of job postings into informative sections.

With reference now to the Figures, example embodiments of the present disclosure will be discussed in further detail.

Example Devices and Systems

Figure 1:
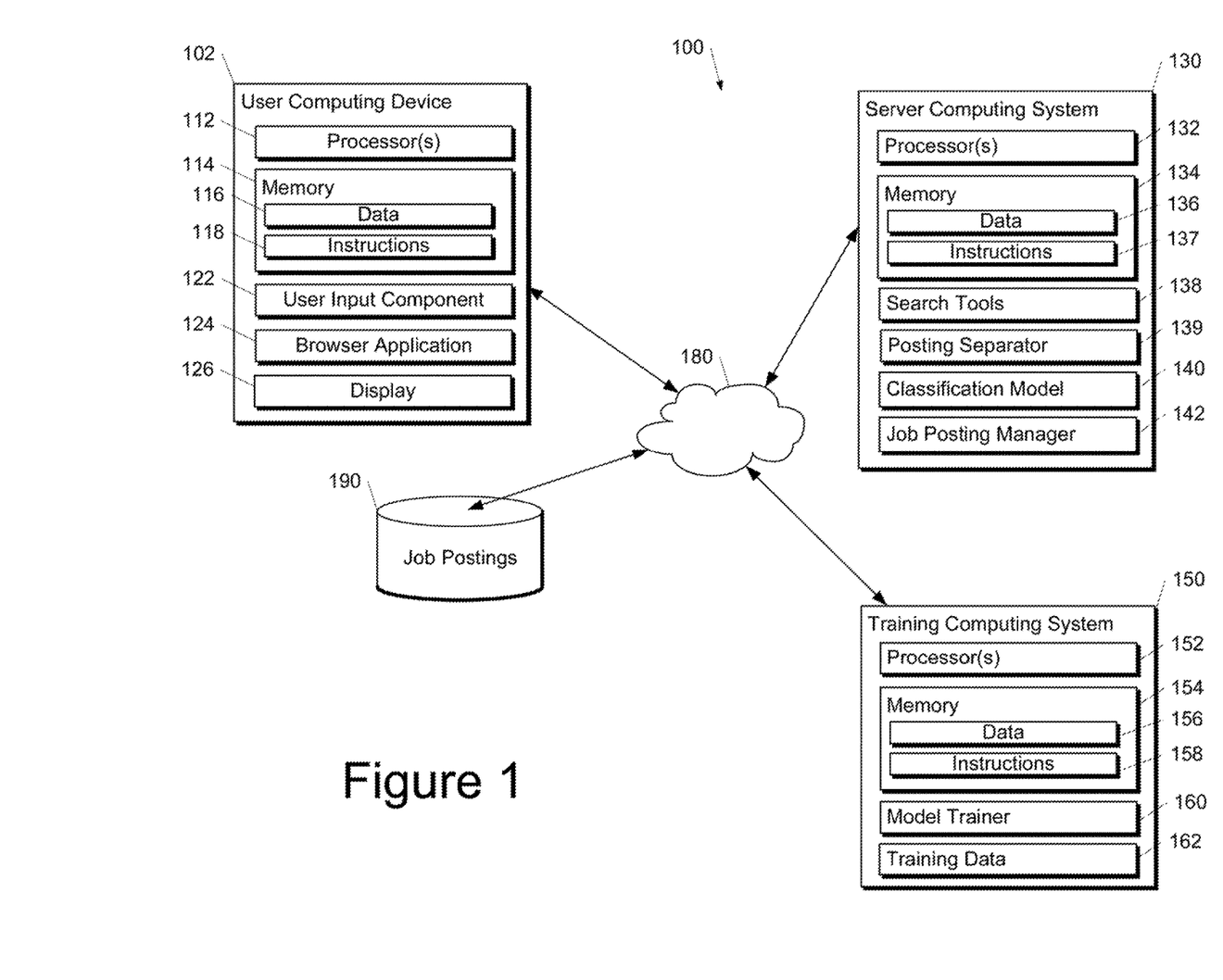
FIG. 1 depicts a block diagram of an example computing system to improve job posting structure according to example embodiments of the present disclosure.

FIG. 1 depicts a block diagram of an example computing system 100 that improves the structure and user-friendliness of job postings according to example embodiments of the present disclosure. The system 100 includes a user computing device 102, a server computing system 130, and, in some implementations, a training computing system 150 that are communicatively coupled over a network 180. In other implementations, the training system 150 is not included.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). In some implementations, the touch-sensitive component can serve to implement a virtual keyboard. Other example user input components include a microphone, a traditional keyboard, or other means by which a user can enter a communication (e.g., a search query).

In some implementations, the user computing device 102 includes a browser application 124. The browser application 124 can be implemented by the one or more processors 112. The browser application 124 can retrieve, present, and traverse information resources from the World Wide Web. The browser application 124 can be a mobile web browser. In one example, the browser application 124 can communication with the server computing system 130 over network 180 to receive a search results page that includes job postings or snippets of job postings.

In some implementations, the user computing device 102 includes a display 126. The display 126 can include different types of display components, such as, for example, a light-emitting diode display (e.g., organic light-emitting diode display), a liquid-crystal display (e.g., thin-film-transistor liquid-crystal display), a thin-film diode display, etc. In some implementations, the display 126 can also be touch-sensitive. For example, the display can be a capacitive touch-screen, a resistive touchscreen, or other touch-sensitive technologies.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

The server computing system 130 can include one or more search tools 138. Search tools 138 can include a job posting search tool or search engine. In some implementations, the search tools 138 can be included in the user computing device 102. The search tools 138 can locate or otherwise retrieve information (e.g., job postings or job posting snippets) that is relevant to a query or other request for information.

The search tools 138 and other components of the server computing system 130 and/or user computing device 102 can access one or more job postings 190 from a database. The database of job postings 190 can be one database or can be multiple databases. The job postings 190 can be obtained from databases associated with company job posting sites, employment web sites or platforms, or other data sources. In some instances, the job postings 190 can be accessible via an application programming interface. In some implementations, the job postings 190 can be HTML documents.

The server computing system 139 can include a posting separator 139. The posting separator 139 can be implemented to separate a job posting into a plurality of portions. For example, computing system 130 can implement the posting separator 139 to perform some or all of methods 200 and 300 of FIGS. 2 and 3.

The server computing system 130 can also store or otherwise include one or more classification models 140. The classification model(s) 140 can be implemented to classify portions of a job posting into sections. For example, computing system 130 can implement the classification model(s) 140 to perform some or all of methods 200, 400, and 500 of FIGS. 2, 4, and 5.

In some implementations, the classification models 140 can be or can otherwise include various machine-learned models such as neural networks (e.g., deep neural networks) or other multi-layer non-linear models. In other implementations, the classification models 140 can be or can otherwise include one or more support vector machines (e.g., structured support vector machines); logistic regression models; and/or other machine-learned models or classifiers.

In some implementations, the classification models 140 can be implemented by the server computing system 140 as a portion of a web service (e.g., a search or information retrieval service and/or a job post coaching service).

In other implementations, one or more classification models can be received by the user computing device 102 from the server computing system 130 over network 180, stored in the user computing device memory 114, and then used or otherwise implemented by the one or more processors 112. Thus, one or more classification models can be stored and implemented at the user computing device 102 and/or one or more models can be stored and implemented at the server computing system 130.

Figure 2:
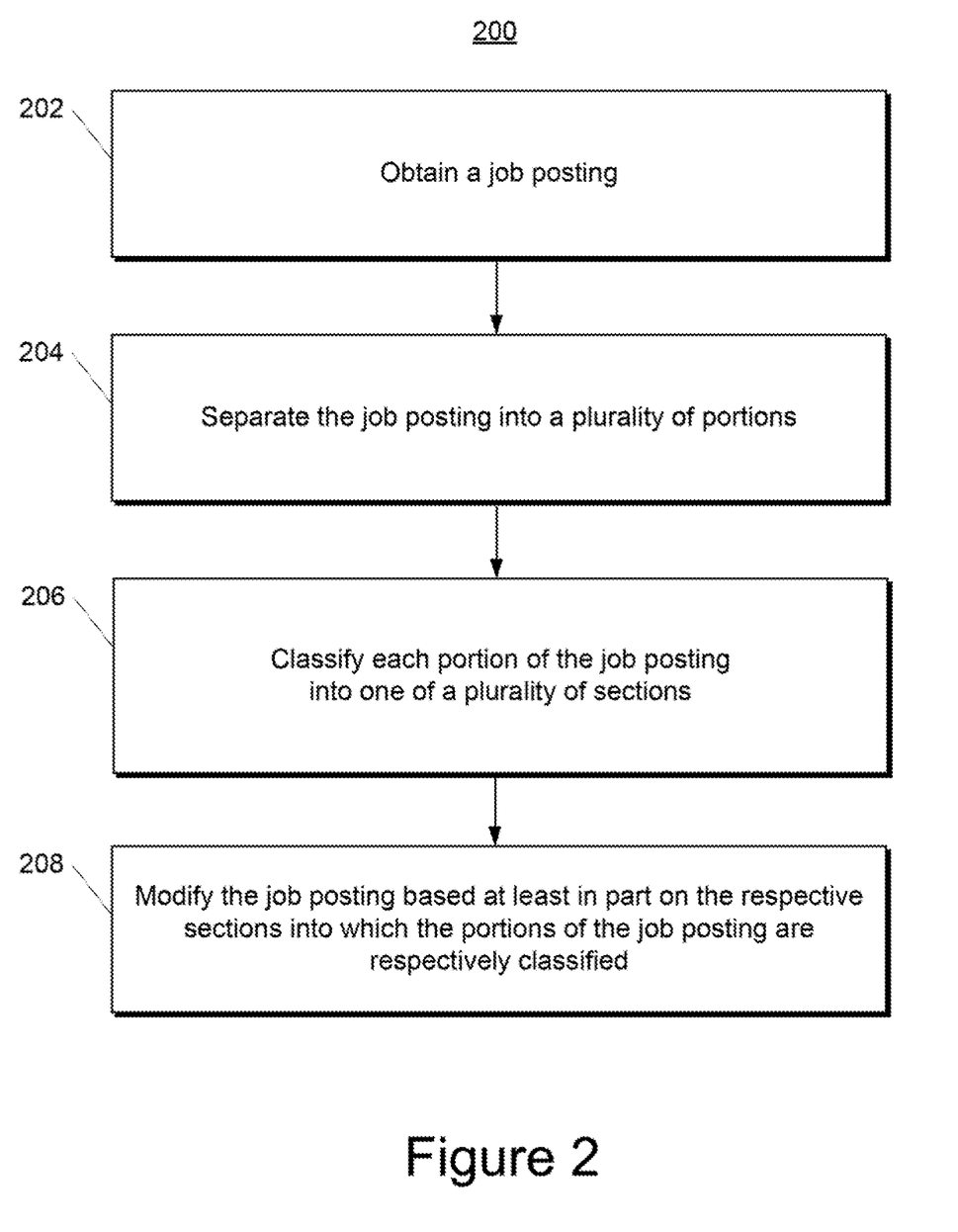
FIG. 2 depicts a flow chart diagram of an example method to improve job posting structure according to example embodiments of the present disclosure.

The server computing system 130 can further include a job posting manager 142. The server computing system 130 can implement the job posting manager 142 to perform various actions on job postings, including, for example, modification of job postings, generation of personalized job postings or job posting snippets, job posting coaching, job posting categorization, or other tasks. In some implementations, computing system 130 can implement job posting manager 142 to perform various aspects of method 200 or other aspects of the present disclosure.

Each of the posting separator 139, classification model 140, and job posting manager 142 can include computer logic utilized to provide desired functionality. Each of the posting separator 139, classification model 140, and job posting manager 142 can be implemented in hardware, firmware, and/or software controlling a general purpose processor. For example, in some implementations, each of the posting separator 139, classification model 140, and job posting manager 142 includes program files stored on a storage device, loaded into a memory and executed by one or more processors. In other implementations, each of the posting separator 139, classification model 140, and job posting manager 142 includes one or more sets of computer-executable instructions that are stored in a tangible computer-readable storage medium such as RAM hard disk or optical or magnetic media.

In implementations in which the classification model 140 includes one or more machine-learned models, the server computing system 130 can train each classification model 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train a classification model 140 based on a set of training data 162. In some implementations, the training data 162 can include, for example, pairs of job text and section label (e.g., <"qualification: 3 years of java experience", "requirement">). For example, the section label can be a manually generated label. In some implementations, the training data 162 can be extracted from job postings mainly based on HTML tags in the format of [job_id, raw_text, section]. In some implementations, the classifier model 140 can be trained via logistic regression on bag of words features (e.g., after term frequency, inverse document frequency, and normalization).

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the user computing device 102 can include the model trainer 160 and the training dataset 162. In such implementations, the classification models can be both trained and used locally at the user computing device 102. In some of such implementations, the user computing device 102 can implement the model trainer 160 to personalize the classification models based on user-specific data.

In some example systems, the models 140 can be included in an application of the computing device. In other example systems, the models 140 can be included in an operating system of the computing device and can interface with applications via an application programming interface.

Example Methods

FIG. 2 depicts a flow chart diagram of an example method 200 to improve job posting structure according to example embodiments of the present disclosure.

At 202, a computing system obtains a job posting. For example, the job posting can be submitted to the computing system by a user. As another example, the job posting can be retrieved from a database of a job posting board or other job search/posting platform. As yet another example, the job posting can be obtained by crawling web pages to identify and extract job postings.

At 204, the computing system separates the job posting into a plurality of portions. For example, the job posting can be separated into the plurality of portions based on syntactic features (e.g., HTML tags), contextual features, or other features. In some implementations, the portions can correspond to paragraphs and the job posting can be separated into the paragraphs based on paragraph breaks. In another example, the job posting can be separated into the portions based on page breaks, line breaks, and/or sentence breaks. In another example, other separation logic can be implemented.

Figure 3:
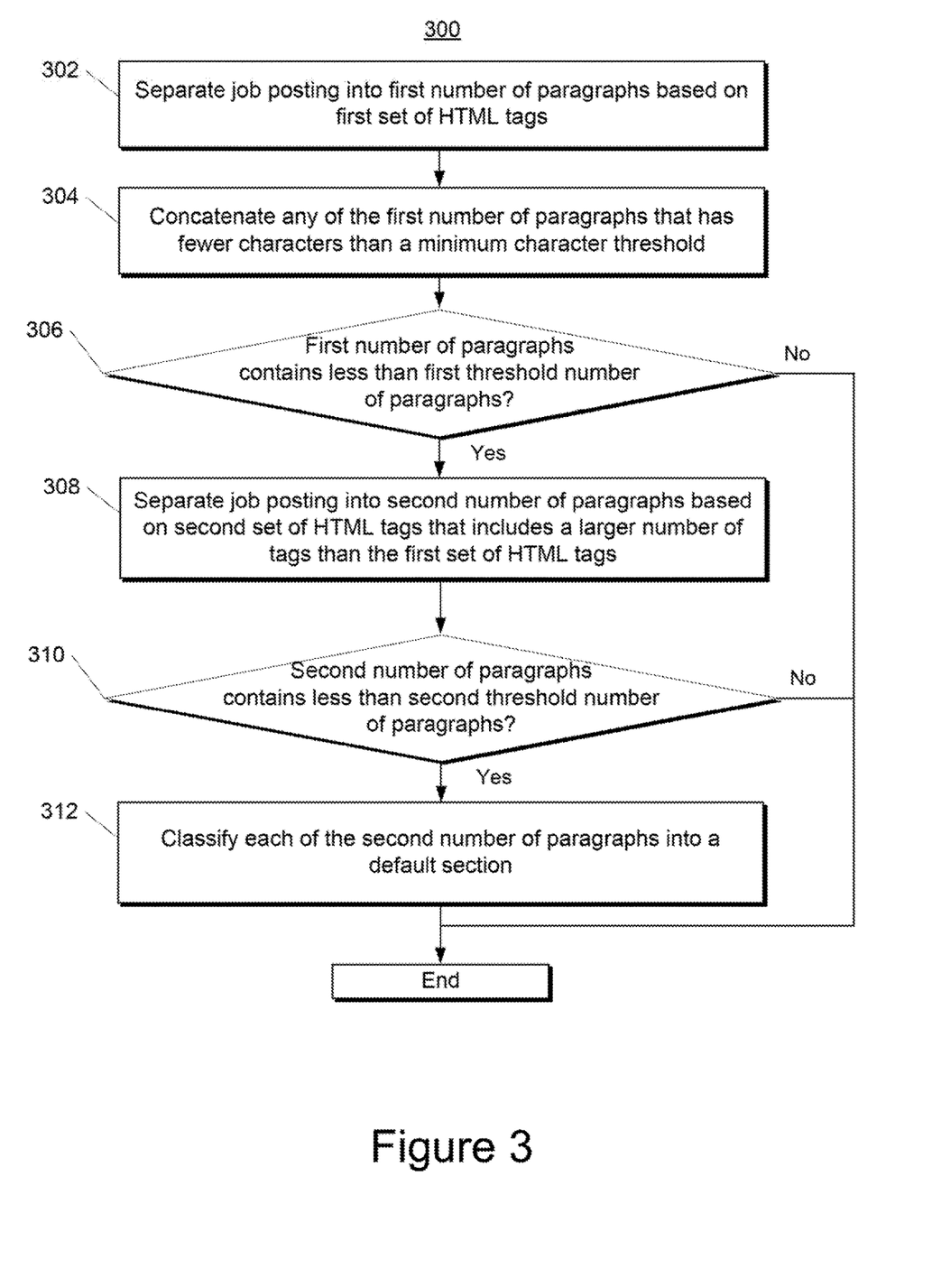
FIG. 3 depicts a flow chart diagram of an example method to separate job postings into portions according to example embodiments of the present disclosure.

As one example method to separate job postings at 204, FIG. 3 depicts a flow chart diagram of an example method 300 to separate job postings into portions according to example embodiments of the present disclosure.

At 302, a computing system separates a job posting into a first number of paragraphs based on a first set of HTML tags. As one example, the first set of HTML tags can include the following HTML tags: ul, ol, p, h[1-6], /ul, /ol, /p, /h[1-6], and/or other tags (ignoring case).

In addition, in some implementations, at 302, the computing system can clean the paragraphs by first removing those tags included in a blacklist after lowercase. For the remaining paragraphs, the computing system can strip away the HTML tags, split on consecutive whitespace (\\s+), and/or remove any empty strings. The computing system can join the parts back with a single whitespace as the joiner. As one example, the blacklist can include the following: ["br", "div", "ul", "ol", "li", "p", "h1", "h2", "h3", "h4", "h5", "h6", "/br", "/div", "/ul", "/ol", "/li", "/p", "/h1", "/h2", "/h3", "/h4", "/h5", "/h6", "tr", "/tr"]. Finally, the computing system can remove any empty paragraph.

At 304, the computing system concatenates any of the first number of paragraphs that has fewer characters than a minimum character threshold. In particular, in some instances, some paragraphs are too short and do not contain enough information for the classifier to make a correct classification. Thus, at 304, short paragraphs are concatenated together (e.g., each short paragraph is concatenated to the previous or subsequent paragraph) until the minimum character threshold is reached. In one example, the minimum character threshold can equal 40 characters.

In some implementations, one exception to the above concatenation scheme is enforced. If the last paragraph in the job posting that is too short, since there is not a subsequent paragraph to which it can be concatenated, the last paragraph would still be valid. In other implementations, if the last paragraph is too short, it can be concatenated to the previous paragraph.

At 306, the computing system determines whether the first number of paragraphs contains less than a first threshold number of paragraphs. For example, the first threshold number of paragraphs can equal two. If the computing system determines at 306 that the first number of paragraphs does not contain less than the first threshold number of paragraphs, then method 300 ends.

However, if the computing system determines at 306 that the first number of paragraphs does contain less than the first threshold number of paragraphs, then method 300 proceeds to 308. At 308, the computing system separates the job posting into a second number of paragraphs based on a second set of HTML tags. In some implementations, the second set of HTML tags includes a larger number of tags than the first set of HTML tags.

As one particular example, in some implementations, at 308, the computing system can perform steps 304 and 306 again with one difference: the second set of HTML tags can include the following HTML tags: ul, ol, p, h[1-6], /ul, /ol, /p, /h[1-6], br, /br, div, /div, and/or other tags (ignoring case). Use of the second set of HTML tags can separate the job posting into a larger number of paragraphs at a finer grain.

At 310, the computing system the computing system determines whether the second number of paragraphs contains less than a second threshold number of paragraphs. For example, the second threshold number can equal two. If the computing system determines at 310 that the second number of paragraphs does not contain less than the second threshold number of paragraphs, then method 300 ends. However, if the computing system determines at 310 that the second number of paragraphs does contain less than the second threshold number of paragraphs, then method 300 proceeds to 312

At 312, the computing system classifies each of the second number of paragraphs into a default section. For example, the default section can be a responsibility and description section. After 312, method 300 ends.

Thus, method 300 provides one example technique to separate job postings into portions. Other techniques can be used as well.

Referring again to FIG. 2, after separating the job posting into the plurality of portions at 204, then at 206 the computing system classifies each portion of the job posting into one of a plurality of sections. The computing system can classify each portion based on various syntactic and/or contextual features associated with such portion and/or words or tokens included in such portion.

In some implementations, the computing system can include and use a machine-learned classifier model to classify each section. The machine-learned classifier model can include various types of machine-learned models such as, for example, support vector machines, artificial neural networks (e.g., deep neural networks), logistic regression classifiers, and/or other types of machine-learned models. Thus, in some implementations, classifying each portion at 206 can include respectively inputting each portion in the machine-learned classifier and, in response, respectively receiving a classification for each portion as an output of the machine-learned classifier. In some implementations, the machine-learned classifier model can be trained on a set of training data that includes pairs of job text and section label, ex. <"qualification: 3 years of java experience", "requirement">. For example, the section label can be a manually generated label or a label generated according to a computer-implemented processing algorithm.

Figure 4:
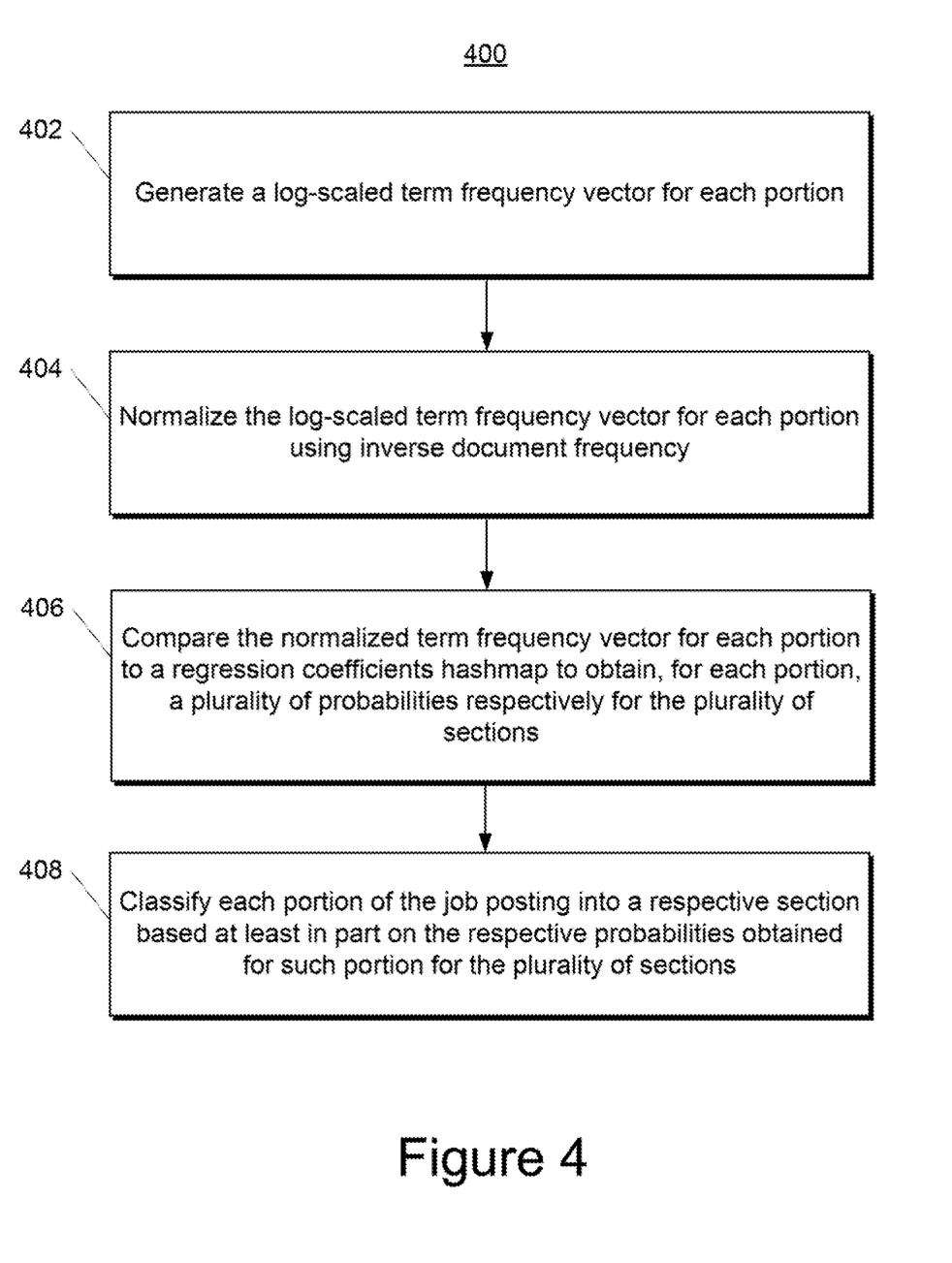
FIG. 4 depicts a flow chart diagram of an example method to classify portions of job postings into sections according to example embodiments of the present disclosure.

As one example method to classify portions of job postings at 206, FIG. 4 depicts a flow chart diagram of an example method 400 to classify portions of job postings into sections according to example embodiments of the present disclosure.

At 402, a computing system generates a log-scaled term frequency vector for each portion of the job posting. As an example, the computing system can split each job portion into tokens by anything other than letters, digits, and/or underscores. The computing system can then create a map to store the frequencies of words in each portion. After the raw term frequency has been obtained, the computing system can logarithmically scale the counts. For example, logarithmic scaling can be performed as follows: 1+log(raw term frequency+1), using base 10 for log.

In the end, for each portion, the computing system can obtain a "vector" (which in some instances may actually be a map) that is in pairs of (token, logarithmically scaled term frequency). One example vector is as follows: {'python': 1.23819, 'java': 1.13819, 'development': 1.0183922 . . . }.

At 404, the computing system normalizes the log-scaled term frequency vector for each portion using inverse document frequency (IDF). In particular, IDF is a calculation technique that penalizes common terms. The IDF technique can be performed on the basis of the frequency of words or tokens contained in a corpus of other job postings included in a training set.

Thus, at 404, the computing system can generate or obtain IDF values in a map form (e.g., token, IDF value of the token). To normalize the log-scaled term frequency vector for each portion, the computing system can multiply, for each portion, all values in the log-scaled term frequency vector by the corresponding IDF value for the corresponding token in the IDF map.

In some implementations, after IDF discounting is done, the computing system can renormalize the vector for each portion. One example renormalization process can proceed as follows:

euclidean_sum=0
for term in log_term_freq_vector:
 euclidean_sum+=log_term_freq_vector[term]^2
euclidean_norm=euclidean_sum^0.5
for term in log_term_freq_vector:
 log_term_freq_vector[term]/=euclidean_norm At 406, the computing system compares the normalized term frequency vector for each portion to a regression coefficients hashmap to obtain, for each portion, a plurality of probabilities respectively for the plurality of sections. For example, the regression coefficients hashmap can be of size M×(N+1) where M is the number of sections and N is the number of features (e.g., tokens appeared in training set). The "+1" can account for the intercept.

In some implementations, given a normalized log-scaled term frequency vector (nm_log_tf_vector) for a portion, the computing system can calculate a score for each section as follows (the benefit section is used in the following example):

score=coef_hashmap["benefit"]["+1"] # intercept
for term in nm_log_tf_vector:
 if term in coef_hashmap["benefit"]:
  score+=nm_log_tf_vector[term] *coef_hashmap["benefit"][term]

The computing system can then convert the score for each section into an assignment probability as follows:

Prob("benefit")=1/(1+e^(-1*score))

Thus, for each portion, the computing system can provide assignment probabilities sorted in descending order. One example set of probabilities for a particular portion is as follows: [('Requirement', 1.0), ('Responsibility and Desc', 0.043), ('Benefit', 0.03), ('Company', 0.007), ('Other', 0.004)].

In some implementations, other techniques can be used at 406 rather than the particular example comparison technique described above. For example, various different forms of logistic regression models can be used to generate section probabilities for each portion.

At 408, the computing system classifies each portion of the job posting into a respective section based at least in part on the respective probabilities obtained for such portion for the plurality of sections. For example, in some implementations, at 408, each portion can be classified in the section that received the highest probability for such portion. For example, for the example probabilities provided above, such portion would be classified into the requirements section.

In other implementations, at 408, for each portion, the computing system can return the section with the highest probability so long as the probability for such section exceeds a corresponding threshold value. The corresponding threshold value used for each section may be the same for all sections or may be specific to the particular section. If the probability for the section with the highest probability does not exceed the corresponding threshold value, then the portion can be classified into the "Other" section with some artificial confidence.

As one example of the above described implementations, for a particular portion, assume the section with the highest assignment probability is X with a probability of Y. If Y>=threshold[X], return X (i.e., classify the portion into section X) with probability Y. However, if Y<threshold[X], classify the portion into the "Other" section with an artificial probability of, for example, 0.5.

Thus, method 400 provides one example technique to classify portions of a job posting into sections. Other methods can be used as well.

In addition, in some implementations, method 400 can further include performing a smoothing technique. For example, the smoothing technique can be performed prior to or subsequent to step 408.

More particularly, in some instances, the techniques described herein can separate a large portion into multiple smaller portions that might receive different classification results. Such classification is not necessarily "wrong", but people would usually expect the whole of the large portion to get classified into one single section. Thus, in some implementations, the computing system can smooth the classification results according to the neighboring portions.

Figure 5:
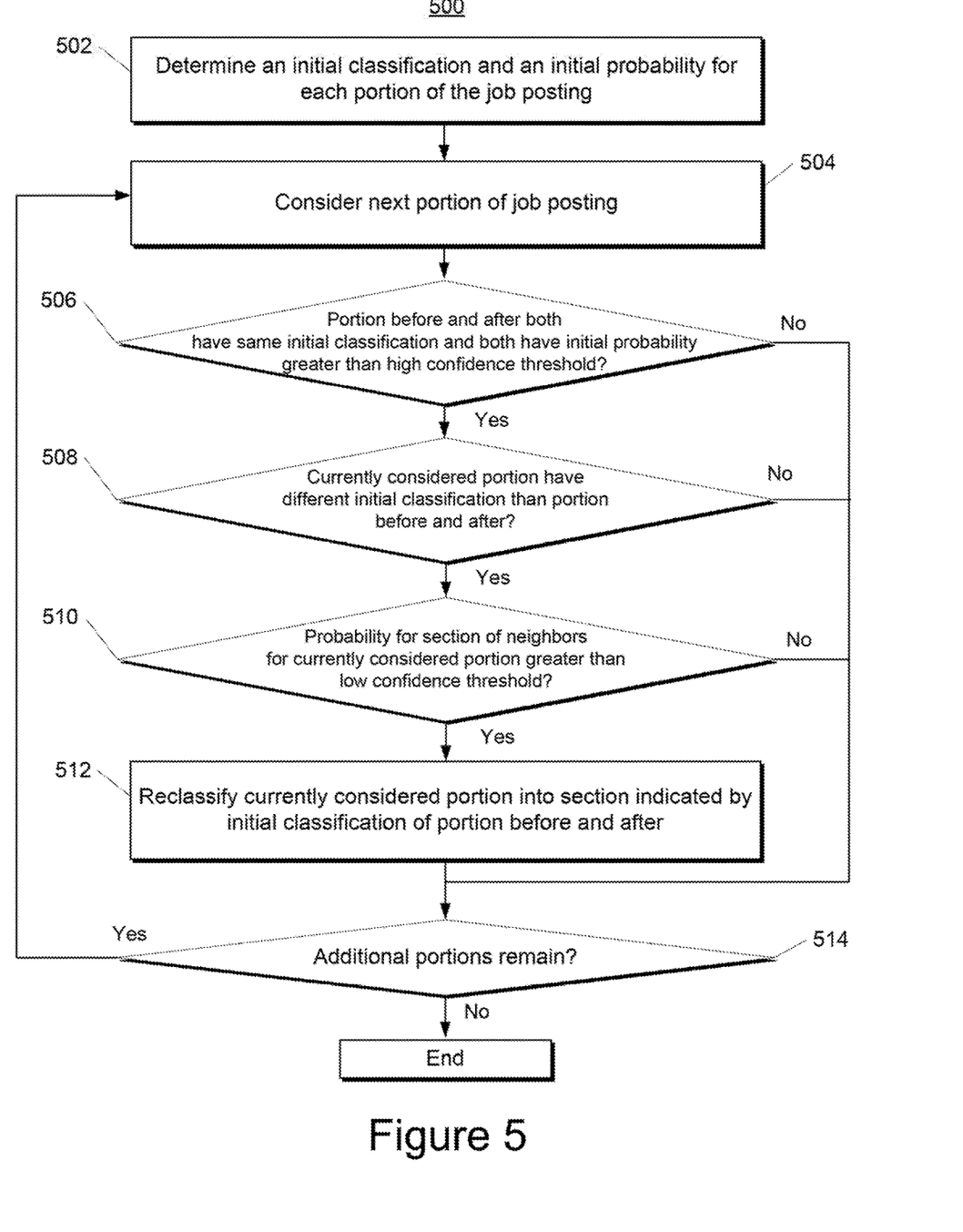
FIG. 5 depicts a flow chart diagram of an example method to classify portions of job postings into sections according to example embodiments of the present disclosure.

As one example smoothing technique, FIG. 5 depicts a flow chart diagram of an example method 500 to classify portions of job postings into sections according to example embodiments of the present disclosure.

At 502, a computing system determines an initial classification and an initial probability for each portion of the job posting. For example, the initial classification and an initial probability for each portion can be determined as described with reference to FIG. 4.

At 504, the computing system considers the next portion of the job posting. For example, at the first instance of 504, the computing system can consider the first portion of the job posting. At subsequent instances of 504, the computing system considers the next or subsequent portion of the job posting. In such fashion, each portion of the job posting can be considered.

At 506, the computing system determines whether the portions before and after the currently considered portion both have a same initial classification and both have an initial probability that is greater than a high confidence threshold. For example, the high confidence threshold can be set to 0.6.

If the computing system determines at 506 that such conditions are not met, then method 500 proceeds to 514. However, if the computing system determines at 506 that such conditions are met, then method 500 proceeds to 508.

At 508, the computing system determines whether the currently considered portion has a different initial classification than the portions before and after the currently considered portion. If the computing system determines at 508 that such condition is not met, then method 500 proceeds to 514. However, if the computing system determines at 508 that such condition is met, then method 500 proceeds to 510.

At 510, the computing system determines whether the currently considered portion has a probability for the initial classification of the portions before and after that is greater than a low confidence threshold. For example, the low confidence threshold can be set to 0.25.

If the computing system determines at 510 that such condition is not met, then method 500 proceeds to 514. However, if the computing system determines at 510 that such condition is met, then method 500 proceeds to 512.

At 512, the computing system re-classifies the currently considered portion into the section indicated by the initial classification of the portions before and after the currently considered portion.

In some implementations, at 512, the computing system can further set the top probability for the currently considered portion as the same probability value that the currently considered portion initially received for the section into which it has been reclassified (e.g., the section associated with the portions before and after).

To provide an example, say a particular portion has the following initial probabilities: [('Requirement', 1.0), ('Responsibility and Desc', 0.56), ('Benefit', 0.03), ('Company', 0.007), ('Other', 0.004)]. Thus, such portion would initially be classified into the Requirement section. Further assume that the particular portion has been reclassified into the 'Responsibility and Desc' section at 512. In such example, the final classification and probability should be: ('Responsibility and Desc', 0.56).

Furthermore, in some implementations, at 512, the computing system can add a flag indicating that smoothing has affected the result for the currently considered portion. Such flag can be useful for future debugging use and refinement on thresholds.

At 514, the computing system determines whether additional portions remain. If the computing system determines at 514 that additional portions do remain, then method 500 returns to 504 and considers the next portion of the job posting. In such fashion, steps 504 through 514 can be iteratively repeated until all portions have been considered. However, if the computing system determines at 514 that additional portions do not remain, then method 500 ends.

In some implementations, rather than actively reclassifying a portion that has been identified according to the conditions of method 500, the computing system can simply provide a notification to the owner of creator of the job posting that the identified portion may be misplaced. Thus, aspects of method 500 can be used to provide real-time or after-the-fact job post coaching.

Referring again to FIG. 2, after classifying each portion of the job posting at 206, then at 208 the computing system modifies the job posting based at least in part on the respective sections into which the portions of the job posting are respectively classified.

As one example modification that can be performed at 208, in some implementations, the computing system can add a header for a particular section to the job posting if such header is missing. For example, if a portion of the job posting is classified into the requirements section, but there is not a header or label of any sort mentioning "Requirements" in the original job posting, then the computing system can add a label or header just before the portion. The header can have the appropriate font, indentation, etc. Addition of a header in this fashion can render the job posting more readable and improve the job posting structure.

In another example modification that can be performed at 208, in some implementations, the computing system can color the portions of the job posting differently according to the sections into which they were classified. For example, all portions classified into the requirements section can be colored red while all portions classified into the benefits section can be colored green. Since certain portions classified into the same section might appear in the job posting at multiple places unconnected to each other, the addition of coloring as described above can make it easier for a job seeker to recognize all the text belonging to a section in which they are interested. In some implementations, the colors respectively assigned to the sections can be adjustable and/or toggleable by a user, so that a user can easily recognize the sections in which they are specifically interested.

In yet another example modification that can be performed at 208, in some implementations, the computing system can reconstruct the job posting by, for example, reordering the portions such that portions of the job posting such that each set of one or more portions that are classified into a same respective section are placed in adjacent to each other. Thus, the structure of the job posting can be improved by placing related portions together, when the original job posting may have included the portions in a less orderly fashion.

Furthermore, by improving the structure of the job posting, the structure and utility of corresponding job posting snippets can be improved as well. Thus, by determining an improved classification for the portions of the job posting, a snippet of such job posting can include structured and informative information for each of one or more of the sections. Alternatively or additionally, the snippet of the job postings can include portions that have been classified into the sections that are generally regarded as the most important. For example, the requirements section is generally regarded as more important than the other section.

According to another aspect of the present disclosure, in some implementations, the computing system can modify the job posting at 208 to provide a personalized version of the job posting or personalized snippet of the job posting. For example, when providing the job posting or a snippet of the job posting for display to a particular user, the computing system can first retrieve user preference information associated with such user. In particular, the particular user may have explicitly entered a ranking of section importance. Additionally or alternatively, such user preference information can be inferred based on user feedback, user actions/ activity, or other information. For example, if a user more frequently performs searches the include terms related to benefits, then the computing system can infer that the user places a higher importance on the benefits section. Likewise, if the user more frequency clicks on or interacts with the benefits sections of job postings, then again it can be inferred that the user places higher importance on the benefits section.

In one example, at 208, the computing system can reorder the portions of the job posting such that the portions are presented according to a ranking of section importance associated with the particular user. Thus, for example, a user may have explicitly or implicitly indicated that she prefers to first review the benefits section, then the requirements section, and so forth. The computing system can reorder the portions of the job posting based on their assigned classifications so that portions classified into the benefits section are provided first, the portions classified into the requirements section are provided second, and so forth. Other users may have different rankings of section importance and the job posting can be modified according to such different rankings.

In another example, at 208, the computing system can generate a personalized snippet of the job posting based at least in part on the ranking of section importance. For example, the personalized snippet can include only a maximum number of snippets from the maximum number of highest ranked sections. In another example, snippets can be selected according to the ranking until a defined screen space or area is filled. In another example, the size of a respective snippet taken from each section can be correlated to the importance of such section (e.g., higher ranked sections have larger snippets taken therefrom).

Thus, in some implementations, the computing system can use user preference information in combination with the classification of the portions into the sections to provide the particular user with a personalized version of the job posting or personalized snippet of the job posting. Generation and presentation of user-specific job postings and snippets provides a unique and user-friendly job search experience that is tailored to each particular user's preferences.

According to another aspect of the present disclosure, in some implementations, the predicted classifications for the portions of the job posting can affect the job posting's ranking as a search result. For example, the computing system can penalize a job posting that, following classification, is missing significant sections (e.g., the job posting does not have at least a respective one of the plurality of portions classified into each of a plurality of required sections). In some implementations, the set of required sections can be user-defined, such that a job posting's search result ranking is penalized if the job posting does not include at least one portion classified into each of such user-defined required sections In another example, in some implementations, the computing system can assign different weights to keyword matches found in different sections. Thus, in such implementations, the classification of a portion into a particular section will influence the weight assigned to keywords matched to a search query from such section. For example, matching keywords from a portion classified into the company section might be weighted less than matching keywords from a portion classified into the requirements section. In some implementations, the weighting applied to keyword matches from different sections can be user-defined or based on the user-specific ranking of section importance described above. Thus, the computing system can provide improved, user-specific search results by weighting keywords according to user preferences regarding section importance.

According to another aspect of the present disclosure, in some implementations, the classification of the portions into sections can yield benefits when attempting to classify the job posting as a whole into a job category that is descriptive of the type of position listed by the job posting (e.g., road construction job category vs dental hygienist category). In particular, some sections are not as meaningful as others when it comes to classifying jobs into job categories. In some instances, these less meaningful sections can be denominated as "noisy." As an example, the "benefits" and "other" sections tend to be similar across all job postings and therefore contribute less toward performing whole-posting job category classification. As such, in some implementations of the present disclosure, the computing system can remove one or more portions of the job posting that have been classified into one or more noisy sections and, subsequently, classify the job posting into one of a plurality of job categories based on the remaining portions of the job posting.

In addition, in some implementations, the classification of the portions into sections can yield benefits when attempting to extract certain features from the job posting. As examples, a skill extractor can be implemented to attempt to extract required skills from the job posting; a benefits extractor can be implemented to attempt to extract benefits from the job posting; a years of experience extractor can be implemented to extract a number of years of experience required for the job; and/or other extractors can be implemented to extract other features. As such, according to an aspect of the present disclosure, such extractors can be applied to only portions of the job posting that have been classified into a section that is relevant to the feature such extractors are attempting to extract. As examples, the skill extractor can be applied to only portions of the job posting that have been classified into the requirements section; the benefits extractor can be applied to only portions of the job posting that have been classified into the benefits section; and the years of experience extractor can be applied to only portions of the job posting that have been classified into the requirements section. In such fashion, the extractors are given only the most pertinent portions, thereby enabling the extractors to provide more precise, less noisy results and fewer false positives. Providing only certain portions to the extractors also reduces computational time associated with the extractors.

In another example aspect, portions classified into the company section can serve as a description for the company in a profile page for the company.

According to yet another aspect of the present disclosure, in addition to classification after a job posting has been created and posted, the classification techniques described herein can also provide benefits when applied to a scenario in which a job posting is being actively created. In some instances, these benefits may be denominated as "coaching" a job posting creator. As one example, in some implementations, a computing system assisting an employer in creating a job posting can perform classification (e.g., in the background iteratively) on the current draft of the posting and can provide a notification to the employer if certain important sections are missing (e.g., if the classification results in no portions being classified into a certain "important" section). In another example, the computing system can generally indicate which sections are most important.

As another example coaching technique, in some implementations, the computing system can determine that a first portion of the job posting is misplaced based at least in part on the classification. For example, the first portion may be classified into the benefits section but be separated from a main body of portions classified into the benefits section. The computing system can provide a notification to an owner or creator of the job posting that indicates that the first portion is misplaced. The owner or creator can edit the job posting to reposition the first portion into the correct location/order. In further implementations, the computing system can provide statistical feedback to the posting creator. For example, the computing system can indicate sections that would benefit from additional information and can provide an indication of an estimated increase in click-throughs that the posting would receive if such information were provided.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 2-5 depicts steps performed in a particular order for purposes of illustration and discussion, the methods of the present disclosure are not limited to the particularly illustrated order or arrangement. The various steps of each of methods 200, 300, 400, and 500 can be omitted, rearranged, combined, and/or adapted in various ways without deviating from the scope of the present disclosure.

Furthermore, although the present disclosure is specifically discussed with reference to improving job posting structure, the systems, methods, techniques, and aspects of the present disclosure can also be applied to improve the structure of other types of postings or information. For example, the systems, methods, techniques, and aspects of the present disclosure can also be applied to improve the structure of for sale listings, apartment or home listings, dating profiles, or any other unstructured or semi-structured text.

What is claimed is:

1. A computer-implemented method to improve job posting structure, the method comprising:
    obtaining, by one or more computing devices, a job posting;
    separating, by the one or more computing devices, the job posting into a plurality of portions based on at least one of syntactic features or contextual features associated with each portion of the plurality of portions;
    respectively inputting, by the one or more computing devices, each portion of the job posting into a machine-learned classification model, wherein the machine-learned classification model has been trained based at least in part on user-specific data associated with previous job posting interactions by a particular user;
    respectively receiving, by the one or more computing devices, a classification of each portion of the job posting into one of a plurality of sections as an output of the machine-learned classification model; and
    modifying, by the one or more computing devices, a structure of the job posting based at least in part on the respective sections into which the portions of the job posting are respectively classified by the machine-learned classification model and one or more user preferences of the particular user that are associated with the plurality of sections.

2. The computer-implemented method of claim 1, further comprising:
    identifying, by the one or more computing devices, the particular user to whom the job posting will be displayed; and
    determining, by the one or more computing devices, a ranking of section importance associated with the particular user based on one or more previous user interactions with one or more previous job postings;
    wherein modifying, by the one or more computing devices, the job posting comprises reordering, by the one or more computing devices, the plurality of portions of the job posting such that the plurality of portions of the job posting are presented according to the ranking of section importance associated with the particular user.

3. The computer-implemented method of claim 1, further comprising:
    identifying, by the one or more computing devices, the particular user to whom a snippet of the job posting will be displayed; and
    determining, by the one or more computing devices, a ranking of section importance associated with the particular user based on one or more previous user interactions with one or more previous job postings;
    wherein modifying, by the one or more computing devices, the job posting comprises generating, by the one or more computing devices, a personalized snippet of the job posting based at least in part on the ranking of section importance associated with the particular user.

4. The computer-implemented method of claim 1, wherein modifying, by the one or more computing devices, the job posting comprises at least one of:
    adding, by the one or more computing devices, a first header to the job segment above a first portion of the job segment that was classified into a first section, the first header descriptive of the first section;
    assigning, by the one or more computing devices, a plurality of different colorings respectively to the plurality of portions based at least in part on the sections into which the portions are respectively classified;
    reordering, by the one or more computing devices, the plurality of portions of the job posting such that each set of one or more portions that are classified into a same respective section are placed in adjacent to each other.

5. The computer-implemented method of claim 1, wherein modifying, by the one or more computing devices, the job posting comprises:
    determining, by the one or more computing devices, that a first portion of the job posting is misplaced based at least in part on the classification of first portion;
    providing, by the one or more computing devices, a notification to an owner of the job posting that indicates that the first portion of the job posting is misplaced; and
    receiving, by the one or more computing devices, an edit of the job posting from the owner.

6. The computer-implemented method of claim 1, wherein modifying, by the one or more computing devices, the job posting comprises:
    removing, by the one or more computing devices, portions that have been classified into one or more noisy sections; and
    classifying, by the one or more computing devices, the job posting into one of a plurality of job categories based on the remaining portions of the job posting.

7. The computer-implemented method of claim 1, further comprising, at least one of:
    extracting, by the one or more computing devices, skills from only portions of the job posting that have been classified into a requirements section;
    extracting, by the one or more computing devices, benefits from only portions of the job posting that have been classified into a benefits section; and
    extracting, by the one or more computing devices, a years of experience requirement from only portions of the job posting that have been classified into the requirements section.

8. The computer-implemented method of claim 1, further comprising:
   determining, by the one or more computing devices, whether the job posting has at least a respective one of the plurality of portions classified into each of a plurality of required sections; and
   when the job posting does not have at least a respective one of the plurality of portions classified into each of a plurality of required sections, penalizing, by the one or more computing devices, the job posting to reduce a search result ranking of the job posting.

9. The computer-implemented method of claim 1, wherein separating, by the one or more computing devices, the job posting into the plurality of portions comprises:
   separating, by the one or more computing devices, the job posting into a first number of paragraphs based at least in part on a first set of HTML tags associated with the job posting;
   concatenating, by the one or more computing devices, any of the first number of paragraphs that has fewer characters than a minimum character threshold with an adjacent paragraph;
   determining, by the one or more computing devices, whether the first number of paragraphs contains less than a threshold number of paragraphs; and
   in response to a determination that the first number of paragraphs contains less than the threshold number of paragraphs, separating, by the one or more computing devices, the job posting into a second number of paragraphs based at least in part on a second set of HTML tags associated with the job posting, the second set of HTML tags including a larger number of tags than the first set of HTML tags.

10. The computer-implemented method of claim 1, wherein classifying, by the one or more computing devices, each portion of the job posting into one of the plurality of sections comprises:
    generating, by the one or more computing devices, a log-scaled term frequency vector for each of the plurality of portions of the job posting;
    normalizing, by the one or more computing devices, the log-scaled term frequency vector for each portion using inverse document frequency to obtain a normalized term frequency vector for each of the plurality of portions of the job posting;
    comparing, by the one or more computing devices, the normalized term frequency vector for each portion to a regression coefficients hashmap to obtain, for each portion, a plurality of probabilities respectively for the plurality of sections; and
    classifying, by the one or more computing devices, each portion of the job posting into the respective section based at least in part on the respective probabilities obtained for such portion for the plurality of sections.

11. The computer-implemented method of claim 1, wherein classifying, by the one or more computing devices, each portion of the job posting into one of the plurality of sections comprises:
    determining, by the one or more computing devices, an initial classification and an initial probability for each portion of the job posting;
    comparing, by the one or more computing devices, the initial classification and initial probability for each portion to the initial classification and initial probability for one or more adjacent paragraphs; and
    changing, by the one or more computing devices, the initial classification of at least a first portion based on the comparison.

12. A computing system to improve job posting structure, the computing system comprising:
    a machine-learned classification model;
    one or more processors; and
    one or more non-transitory computer-readable medium that store instructions that, when executed by the one or more processors, cause the computing system to perform operations, the operations comprising:
    obtaining a job posting;
    separating the job posting into a plurality of portions based on at least one of syntactic features or contextual features associated with each portion of the plurality of portions;
    respectively inputting each portion of the job posting into the machine-learned classification model, wherein the machine-learned classification model has been trained based at least in part on user-specific data associated with previous job posting interactions by a particular user;
    respectively receiving a respective classification of each portion of the job posting into one of a plurality of sections as an output of the machine-learned classification model; and
    modifying a structure of the job posting based at least in part on the respective sections into which the portions of the job posting are respectively classified by the machine-learned classification model and one or more user preferences of the particular user that are associated with the plurality of sections.

13. The computer system of claim 12, wherein the operations further comprise:
    identifying, by the one or more computing devices, the particular user to whom the job posting will be displayed; and
    determining, by the one or more computing devices, a ranking of section importance associated with the particular user based on one or more previous user interactions with one or more previous job postings;
    wherein modifying, by the one or more computing devices, the job posting comprises reordering, by the one or more computing devices, the plurality of portions of the job posting such that the plurality of portions of the job posting are presented according to the ranking of section importance associated with the particular user.

14. The computer system of claim 12, wherein modifying, by the one or more computing devices, the job posting comprises at least one of:
    adding, by the one or more computing devices, a first header to the job segment above a first portion of the job segment that was classified into a first section, the first header descriptive of the first section;
    assigning, by the one or more computing devices, a plurality of different colorings respectively to the plurality of portions based at least in part on the sections into which the portions are respectively classified;
    reordering, by the one or more computing devices, the plurality of portions of the job posting such that each set of one or more portions that are classified into a same respective section are placed in adjacent to each other.

15. The computer system of claim 12, wherein modifying, by the one or more computing devices, the job posting comprises:

determining, by the one or more computing devices, that a first portion of the job posting is misplaced based at least in part on the classification of first portion;

providing, by the one or more computing devices, a notification to an owner of the job posting that indicates that the first portion of the job posting is misplaced; and receiving, by the one or more computing devices, an edit of the job posting from the owner.

16. The computer system of claim 12, wherein modifying, by the one or more computing devices, the job posting comprises:

removing, by the one or more computing devices, portions that have been classified into one or more noisy sections; and classifying, by the one or more computing devices, the job posting into one of a plurality of job categories based on the remaining portions of the job posting.

17. A non-transitory, computer-readable medium that stores instructions that, when executed by one or more processors of one or more computing devices, cause the one or more computing devices to perform operations, the operations comprising:

obtaining a job posting;

segmenting the job posting into a plurality of paragraphs based on at least one of syntactic features or contextual features associated with each of the plurality of paragraphs;

inputting each paragraph of the job posting into a machine-learned classification model, wherein the machine-learned classification model has been trained based at least in part on user-specific data associated with previous job posting interactions by a particular user;

determining, an initial classification for each of the plurality of paragraphs into one of a plurality of sections by the machine-learned classification model;

comparing, for each of the plurality of paragraphs, the initial classification for such paragraph to the initial classification for one or more neighboring paragraphs;

adjusting the initial classification for at least a first paragraph based at least in part on the comparison performed for the first paragraph; and modifying a structure of the job posting based at least in part on the respective sections into which the paragraphs of the job posting are respectively classified and the one or more user preferences of the particular user that are associated with the plurality of sections.

18. The non-transitory, computer-readable medium of claim 17, further comprising:

determining, for each paragraph, whether the initial probability for each of the one or more neighboring paragraphs is greater than a high confidence threshold value.

19. The non-transitory, computer-readable medium of claim 18, wherein adjusting the initial classification for the first paragraph comprises:

identifying the first paragraph for which:

the initial classification for the first paragraph differs from the initial classification for the one or more neighboring paragraphs;

the initial probability for each of the one or more neighboring paragraphs is greater than the high confidence threshold value; and the initial probability for the first paragraph for the section indicated by the initial classification of the one or more neighboring paragraphs is greater than a low confidence threshold value; and reclassifying the first paragraph into the section indicated by the initial classification of the one or more neighboring paragraph.

* * * * *